United States Patent [19]
Muzzy et al.

[11] Patent Number: 5,558,404
[45] Date of Patent: Sep. 24, 1996

[54] ADJUSTABLE ARMREST

[75] Inventors: Norman E. Muzzy; Corwin L. Klages, both of Cedar Falls; Eric P. Hansotia, Independence, all of Iowa

[73] Assignee: Deere & Company, Moline, Ill.

[21] Appl. No.: 280,262

[22] Filed: Jul. 25, 1994

[51] Int. Cl.⁶ ...................................... A47C 7/54
[52] U.S. Cl. ...................... 297/411.38; 74/89.21
[58] Field of Search ................... 297/411.32, 411.33, 297/411.35, 411.36, 411.38, 411.39; 74/89.21

[56] References Cited

U.S. PATENT DOCUMENTS

| | | |
|---|---|---|
| 3,216,738 | 11/1965 | Bockus . |
| 3,528,304 | 9/1970 | Hopkins .................................. 74/89.21 |
| 4,165,901 | 8/1979 | Swenson et al. ................... 297/411.33 |
| 4,478,308 | 10/1984 | Klaassen . |
| 4,496,190 | 1/1985 | Barley . |
| 4,646,869 | 3/1987 | Kerner, Jr. . |
| 4,828,323 | 5/1989 | Broderson et al. ............. 297/411.38 X |
| 5,169,207 | 12/1992 | Rye ...................................... 297/411.33 |
| 5,188,423 | 2/1993 | Meiller et al. ...................... 297/411.38 |
| 5,275,465 | 1/1994 | Gulliver et al. ................ 297/411.32 X |

FOREIGN PATENT DOCUMENTS

| | | |
|---|---|---|
| 2754543 | 6/1978 | Germany . |
| 2068719 | 8/1981 | United Kingdom . |

*Primary Examiner*—Peter R. Brown

[57] ABSTRACT

An adjustable armrest for use with an operator's seat on a vehicle includes a pair of pins which project laterally from a side of the seat. A generally rectangular frame has an open side which faces the seat. A pair of gear wheels mounted for rotation on the frame about its central axis. Each gear wheel has another bore which is offset from the central bore and which receives one of the pins. A drive gear drives a belt which rotates the gear wheels to move the drive gears and frame with respect to the pins. A knob is slidably and non-rotatably coupled to an end of a sleeve which, in turn, is fixed to the drive gear. The knob is rotatably and non-slidably coupled to an end of a shaft which is slidable in the sleeve. The other end of the shaft is coupled to a locking pawl. As spring urges the knob, shaft and pawl to a locking position wherein the pawl engages the gear wheels cylinders to prevent their rotation. The knob is movable against the spring to disengage the pawl from the gear wheels.

16 Claims, 3 Drawing Sheets

ADJUSTABLE ARMREST

BACKGROUND OF THE INVENTION

The invention relates to an armrest for the seat of a work vehicle, and more particularly, to an armrest which can be adjusted both vertically and horizontally for an operator's specific anatomical characteristics.

Traditionally, the operating controls for tractors and other large work vehicles are mounted raised assemblies directly secured to the floor of the operating compartment on both sides of the-operator's seat. It has been found to be convenient to mount operator controls, such a switches levers and knobs, on an armrest next to the seat. The seat is usually adjustable so that the operator can optimize both comfort and visibility. In addition, many seats are provided with shock absorbing suspensions which moderate shocks to the operator by moving the operator supporting portions of the seat in response to shocks on the vehicle. However, after the seat adjustment, the controls may not be at the optimal location for the operator resulting in either a change in seat placement or discomfort in operating the vehicle. Furthermore, as the operator supporting portions of the seat move in accommodating shocks to the vehicle, the positioning of the controls relative to the seat continually change resulting in additional operator discomfort.

To overcome this problem, a seat assembly with an adjustable armrest has been proposed in U.S. Pat. No. 4,478,308. But, the armrest here is adjustable only vertically relative to the seat.

Other adjustable armrest mechanism have used complicated and bulky four bar linkages. But, four bar linkages allow only one vertical position for each fore-and-aft position. It would be desirable to have an adjustable armrest which permits more than one vertical position for each fore-and-aft position in order to accommodates the correlation of an operator's elbow to hip distance to an operator's forearm length.

SUMMARY OF THE INVENTION

Accordingly, an object of this invention is to provide an adjustable armrest which permits more than one vertical position for each fore-and-aft position in order to accommodates the correlation of an operator's elbow to hip distance to an operator's forearm length.

A further object of the invention is to provide such an adjustable armrest mechanism which is simple and compact.

These and other objects are achieved by the present invention, wherein an adjustable armrest for use with an operator's seat on a vehicle includes a pair of pins which project laterally from a side of the seat. A generally rectangular frame has an open side which faces the seat. A pair of gear wheels mounted for rotation on the frame about its central axis. Each gear wheel has another bore which is offset from the central bore and which receives one of the pins. A drive gear drives a belt which rotates the gear wheels to move the drive gears and frame with respect to the pins. A knob is slidably and non-rotatably coupled to an end of a sleeve which, in turn, is fixed to the drive gear. The knob is rotatably and non-slidably coupled to an end of a shaft which is slidable in the sleeve. The other end of the shaft is coupled to a locking pawl. As spring urges the knob, shaft and pawl to a locking position wherein the pawl engages the gear wheels cylinders to prevent their rotation. The knob is movable against the spring to disengage the pawl from the gear wheels.

DETAILED DESCRIPTION

Figure 1:
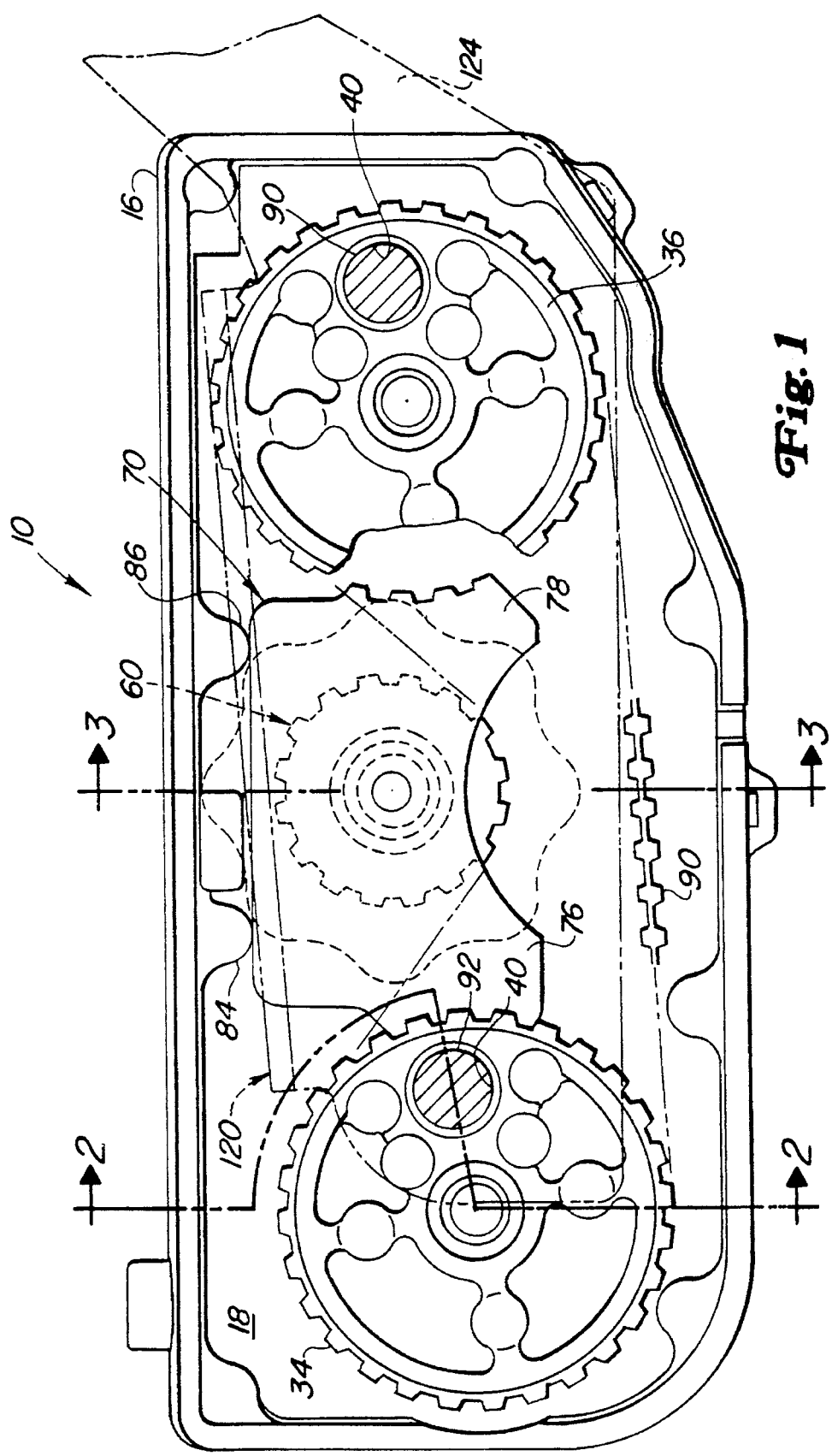
FIG. 1 is a side view of an adjustable armrest mechanism according to the present invention.
Figure 2:
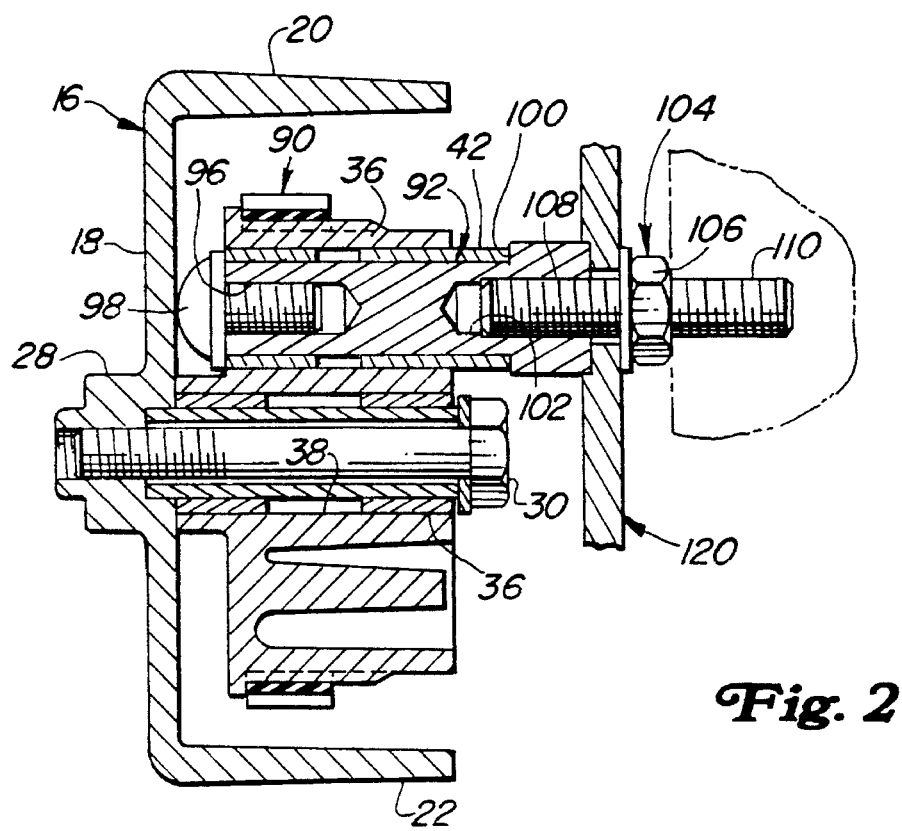
FIG. 2 is a sectional view taken along line 2—2 of FIG. 1.

The armrest adjustment mechanism 10 includes a frame 16 has a generally rectangular box shape with a side wall 18, top wall 20 and bottom wall 22. The frame is open on the side facing the operator's seat (not shown). Hubs 24, 26 and 28 are formed in the side wall 18. Hubs 24 and 28 are positioned on either side of central hub 26. A pair of posts or bolts 30 are screwed into threaded bores in hubs 24 and 28. A pair of cylindrical gear wheels 34 35 are mounted for rotation on the bolts 30 via bearings 36. Each of the gear wheels 34 35 has a central bore 38 which receives a corresponding one of the bolts 30. Each gear wheel 34,35 includes a set of gear teeth which project radially outwardly therefrom. Each of the gear wheels 34 35 also has a bore 40 which extends parallel to the corresponding central bore 38 and which is offset or spaced apart from the central bore 38. Each bore receives a hollow cylindrical bearing 42.

Figure 3:
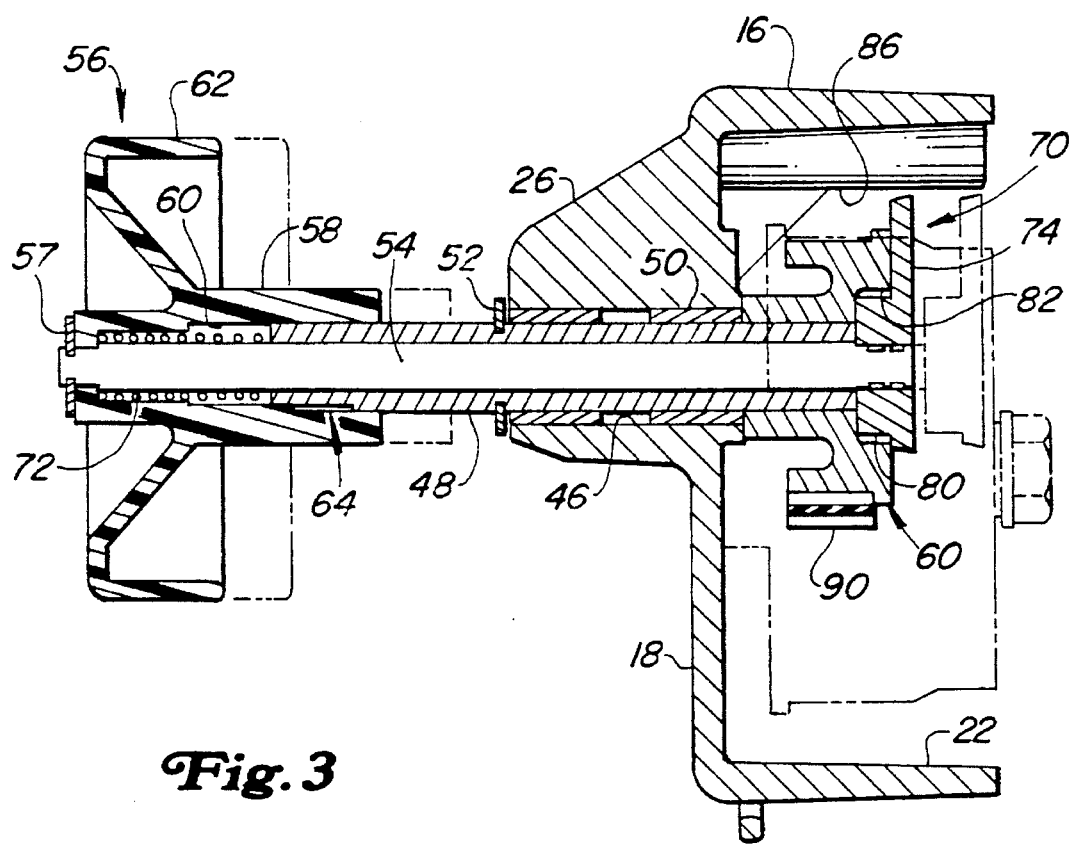
FIG. 3 is sa sectional view taken along lines 3—3 of FIG. 1.
Figure 5:
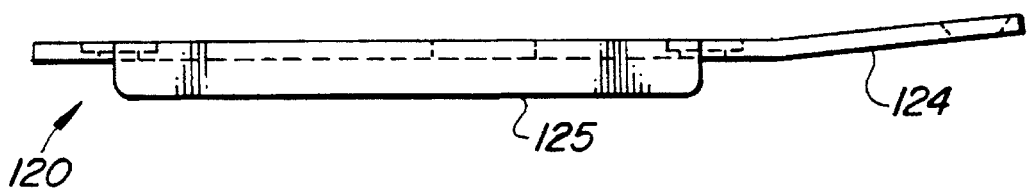
FIG. 5 is a top view of the bracket member of FIG. 4.
Figure 4:
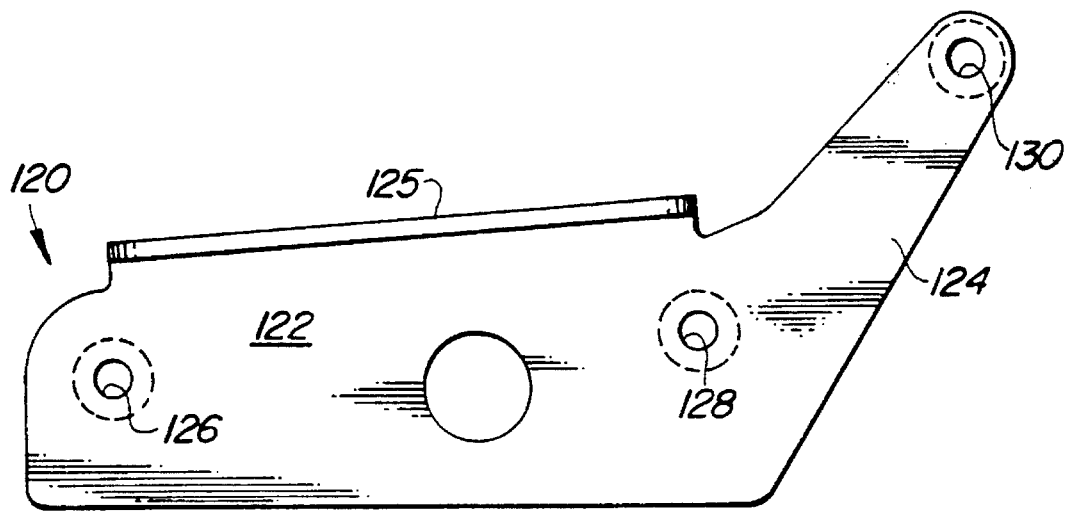
FIG. 4 is side view of the bracket member of the present invention.

An operator controlled actuator 44 is mounted in a bore 46 in hub 26. Actuator 44 includes a hollow cylindrical sleeve 48 which is rotatably received in bore 46 via bearing 50. A snap ring 52 is mounted in a groove in the sleeve 48 to prevent sleeve 48 moving to the right, viewing FIG. 3. A shaft 54 is slidably received in the sleeve and projects from both ends of the sleeve 48. A knob 56 includes a hub 58 with a bore 60 extending therethrough and a wheel 62. The hub 58 of the knob 56 is slidably and non-rotatably coupled to an end of sleeve 48 via splined connection 64. The end of sleeve 48 is received by the hub 58. The other end of sleeve 48 is fixed to cylindrical drive gear 66.

The knob 56 is rotatably and non-slidably coupled to an end of shaft 54 and is retained thereon by snap ring 57. The other end of shaft 54 is fixed to a pawl 70. A spring 72 is mounted on shaft 54 between the hub 58 and the end of sleeve 48 and urges the knob 56 to the left viewing FIG. 3.

As best seen in FIG. 1, the pawl 70 comprises a plate 74 with a pair of concave curved end portions 76,78 which have teeth for meshing engagement with gear wheels 34,35, respectively. As best seen in FIG. 1, the pawl 70 has a hub 80 which is received by a recess 82 in an end of the drive gear 66. A pair of ridges 84,86 are formed on the interior of top wall 20. The ridges 84, 86 are slidably engageable with the top of pawl 70 to prevent pawl 70 from rotating when the knob 56 is rotated.

A cogged belt 90 is wrapped around gear wheels 34,35 and has inner teeth which mesh with the gear teeth thereon. Cogged belt 90 is has outer teeth which mesh with the gear teeth on drive gear 66. Alternatively, a shorter belt than that shown in FIG. 1 could be used, in which case it would need only internal teeth and gear wheels 34,35 and drive gear 60 would all be on the inside of the belt.

The adjustable armrest mechanism 10 includes a pair of pins 92 and 94 which are received by the bearings 42 and which are fixed to and project horizontally from a side of an operator's seat (not shown). A blind threaded bore 96 in the outer end of the pins 92,94 receives a cap screw 98 which engages one end of the bearings 42 and retains the pins 92,94 within the bearings 42. The other end of the bearings 42 engages a shoulder 100 formed on the pins 92,94. A blind threaded bore 102 entends into the inner end of pins 92,94. A spacer member 104 includes a cylindrical spacer 106 and a pair of threaded shafts 108 and 110 which project from opposite sides thereof. Shafts 110 are screwed into corresponding threaded bores (not shown) in a side frame member (not shown) of an operator's seat (not shown). The pins 92,94 are screwed onto the shafts 108 so that the pins 92,94 are thereby fixed with respect to the operator's seat (not shown).

A stiffening bracket 120 is held between the spacer 106 and the inner ends of the pins 92,94. The bracket 120 has a generally rectangular portion 122 which extends an arm 124. An edge 125 of rectangular portion 122 is bent to add stiffness to the bracket 120. Bores 126 and 128 receive the shafts 108 of the spacer members 104. Another bore 130 is formed near the end of arm 124. A bolt (not shown) is preferably inserted into bore 130 and screwed into a corresponding threaded bore (not shown) in the operator's seat. A seat belt anchor bolt could be used for this purpose. The bores 126, 128 and 130 are preferably positioned in a triangular arrangement and the anchoring at bore 130 helps resist twisting of the armrest mechanism 10 about a horizontal axis.

The spring 72 urges the knob 56, the shaft 54 and the pawl 70 to a locked position wherein the pawl 70 engages the gear wheels 34,35 to prevent rotation thereof. The knob 56 may moved to the right, viewing FIG. 3, to move the pawl 70 to an adjustment position (shown in phantom in FIG. 3) wherein the pawl 70 is disengaged from the gear wheels 34,35 to permit rotation of the knob 56, the sleeve 48, the drive gear 66, belt 90 and the gear wheels 34,35. Rotation of gear wheels 34,36 moves the posts 30, and thus the frame 16 relative to the pins 92,94 and thus, relative to the seat (not shown). The knob 56 may be rotated either clockwise or counter-clockwise. As a result, the frame 16 may be moved up or down in a circular manner when the posts 30 are to the rear of their respective pins 92,94 as shown in FIG. 1, or when the posts 30 are forward of their respective pins 92,94.

While the present invention has been described in conjunction with a specific embodiment, it is understood that many alternatives, modifications and variations will be apparent to those skilled in the art in light of the foregoing description. For example, the actuator could have a gear sprocket which is coupled directly to the gear wheel rather than indirectly through a drive belt. Alternatively, the actuator could be configured as a worm gear which would be coupled to the gear wheels and which would extend perpendicular with respect to the axis of the gear wheels. Accordingly, this invention is intended to embrace all such alternatives, modifications and variations which fall within the spirit and scope of the appended claims.

What is claimed is:

1. An adjustable armrest for use with an operator's seat on a vehicle, the armrest comprising:

a frame;

a driven member mounted for rotation on the frame and having a central axis about which it rotates, and having a bore which extends parallel to its central axis and which is spaced apart from said central axis, said bore for rotatably receiving a pin which is adapted to be fixed with respect to the operator's seat and projecting generally horizontally therefrom; and an operator controlled actuator rotatably mounted on the frame and coupled to the driven member to cause the driven member to rotate with respect to the frame, the rotating driven member cooperating with the pin for causing movement of the driven member and frame with respect to the fixed pin.

2. The armrest of claim 1, wherein:

the actuator comprises a sleeve slidable and rotatable in a bore in the frame, a knob slidably and non-rotatably coupled to an end of the sleeve, a sprocket non-rotatably coupled to another end of the sleeve and drivingly coupled to the driven member and a shaft slidable received by the sleeve, one end of the shaft being coupled to the knob; and a pawl mounted on another end of the shaft, the actuator being movable from a looking position wherein the pawl engages the driven member to prevent rotation thereof to an adjustment position wherein the pawl is disengaged from the driven member to permit rotation of the knob, the sleeve, the sprocket and the driven member.

3. The armrest of claim 2, wherein:

a cog belt couples the sprocket to the driven member.

4. The armrest of claim 2, wherein:

the knob is movable axially to move the pawl axially into and out of engagement with the gear teeth of the driven member.

5. The armrest of claim 2, wherein:

a spring is mounted on the shaft between the knob and an end of the sleeve, the spring being biased to urge the knob, shaft and pawl to the locking position.

6. The armrest of claim 2, wherein:

the frame has an open side facing away from the knob.

7. The armrest of claim 2, wherein:

a ridge projects from the frame, the ridge slidably engaging the pawl to prevent rotation of the pawl.

8. The armrest of claim 1, wherein:

the driven member comprises a cylindrical member with a set of gear teeth projecting radially from an outer periphery thereof;

the actuator comprises a sprocket; and a cog belt couples the sprocket to the driven member.

9. The armrest of claim 1, wherein:

the frame comprises a first frame part and a second frame part, each frame part having a stepped bore, each stepped bore receiving a corresponding end of the driven member, and each stepped bore defining a shoulder which is engagable with a corresponding end of the driven member to hold the driven member axially in place between the first and second frame parts.

10. An adjustable armrest for use with an operator's seat on a vehicle, the armrest comprising:

a frame;

a pair of gear wheels mounted for rotation on the frame, each gear wheel having a central axis about which it rotates, and each gear wheel having a bore which extends parallel to its central axis and which is spaced apart from said central axis, said bore for rotatably receiving a pin which is adapted to be fixed with respect to the operator's seat and projecting generally horizontally therefrom; and an operator controlled actuator movably mounted on the frame and releasably engaging the gear wheels to cause the gear wheels to rotate with respect to the frame, the rotating gear wheels for cooperating with the pins to cause movement of the gear wheels and frame with respect to the fixed pins.

11. The armrest of claim 10, wherein:

each gear wheel comprises a cylindrical member with a set of gear teeth projecting radially from an outer periphery thereof;

the actuator comprises a sprocket; and a belt couples the sprocket to both of the gear wheels.

12. The armrest of claim 10, wherein the actuator comprises:

a sleeve rotatable in a bore in the frame;

a knob slidably and non-rotatably coupled to an end of the sleeve;

a sprocket non-rotatably coupled to another end of the sleeve and drivingly coupled to the gear wheels;

a shaft slidable received by the sleeve, one end of the shaft being coupled to the knob; and a pawl mounted on another end of the shaft, the actuator being movable from a locking position wherein the pawl engages the gear wheels to prevent rotation thereof to an adjustment position wherein the pawl is disengaged from the gear wheels to permit rotation of the knob, the sleeve, the sprocket and the gear wheels.

13. The armrest of claim 12, wherein:

a spring is mounted on the shaft between the knob and an end of the sleeve, the spring being biased to urge the knob, shaft and pawl to the locking position.

14. The armrest of claim 12, wherein:

the frame is open on a side opposite the knob.

15. The armrest of claim 12, wherein:

a ridge projects from the frame, the ridge slidably engaging the pawl to prevent rotation of the pawl.

16. The armrest of claim 10, wherein:

the frame has a pair of spaced apart bores;

a pair of posts, one post mounted in each of the frame bores, the gear wheels being rotatably mounted on the posts.

* * * * *